United States Patent
Sun

(10) Patent No.: US 9,709,778 B2
(45) Date of Patent: Jul. 18, 2017

(54) IMAGING LENS AND IMAGING APPARATUS EQUIPPED WITH THE IMAGING LENS

(71) Applicant: FUJIFILM Corporation, Tokyo (JP)

(72) Inventor: Ping Sun, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 26 days.

(21) Appl. No.: 14/864,260

(22) Filed: Sep. 24, 2015

(65) Prior Publication Data

US 2016/0011407 A1 Jan. 14, 2016

Related U.S. Application Data

(63) Continuation of application No. PCT/JP2013/007606, filed on Dec. 26, 2013.

(30) Foreign Application Priority Data

Mar. 27, 2013 (JP) ................. 2013-065915

(51) Int. Cl.
   *G02B 13/18* (2006.01)
   *G02B 3/02* (2006.01)
   (Continued)

(52) U.S. Cl.
   CPC ............... *G02B 13/04* (2013.01); *G02B 9/64* (2013.01); *G02B 27/0025* (2013.01);
   (Continued)

(58) Field of Classification Search
   CPC G02B 13/0045; G02B 27/0025; G02B 5/005; G02B 13/0015; G02B 15/177; G02B 9/00
   (Continued)

(56) References Cited

U.S. PATENT DOCUMENTS 5,434,713 A 7/1995 Sato
5,513,045 A 4/1996 Ito et al.
(Continued)

FOREIGN PATENT DOCUMENTS

JP 61-200520 9/1986
JP 02-248910 10/1990
(Continued)

OTHER PUBLICATIONS

International Search Report, PCT/JP2013/007606, Apr. 8, 2014.
(Continued)

*Primary Examiner* — Evelyn A Lester
(74) *Attorney, Agent, or Firm* — Young & Thompson

(57) ABSTRACT

An imaging lens is constituted by, in order from the object side to the image side: a negative front group; a stop; and a positive rear group. The front group is constituted by, in order from the object side to the image side, a front group negative lens group, constituted by at least two negative lenses, and a front group positive lens group including one negative lens and one positive lens, in which a positive lens is provided most toward the object side. The rear group includes one negative lens and one positive lens. Conditional Formula (1) below is satisfied:

$$Nan+0.01 \cdot van < 2.15 \quad (1)$$

wherein Nan and van respectively are the refractive index with respect to the d line and the Abbe's number with respect to the d line of the negative lens provided most toward the image side within the front group positive lens group.

11 Claims, 5 Drawing Sheets

(51) Int. Cl.
*G02B 13/04* (2006.01)
*G02B 9/34* (2006.01)
*G02B 9/64* (2006.01)
*G02B 27/00* (2006.01)
*G02B 9/00* (2006.01)
*G02B 13/00* (2006.01)
*G02B 15/177* (2006.01)
*G02B 5/00* (2006.01)

(52) U.S. Cl.
CPC ............... *G02B 5/005* (2013.01); *G02B 9/00* (2013.01); *G02B 13/0015* (2013.01); *G02B 13/0045* (2013.01); *G02B 15/177* (2013.01)

(58) Field of Classification Search
USPC ........ 359/713–717, 740, 751–753, 761, 762, 359/770, 781, 788
See application file for complete search history.

(56) References Cited

U.S. PATENT DOCUMENTS

| | | |
|---|---|---|
| 5,666,228 A | 9/1997 | Yamamoto |
| 5,684,643 A | 11/1997 | Enomoto et al. |
| 6,181,483 B1 | 1/2001 | Takatsuki |
| 2010/0208366 A1 | 8/2010 | Inoue |
| 2011/0310496 A1* | 12/2011 | Kubota ............... G02B 9/64 359/794 |
| 2013/0162887 A1 | 6/2013 | Morooka |

FOREIGN PATENT DOCUMENTS

| | | |
|---|---|---|
| JP | 05-273459 | 10/1993 |
| JP | 07-63989 | 3/1995 |
| JP | 09-96759 | 4/1997 |
| JP | 09-127412 | 5/1997 |
| JP | 2000-039553 | 2/2000 |
| JP | 3368138 | 1/2003 |
| JP | 2009-058817 | 3/2009 |
| JP | 2010-191069 | 9/2010 |
| JP | 2013-130669 | 7/2013 |

OTHER PUBLICATIONS

PCT/ISA/237, PCT/JP2013/007606, Apr. 8, 2014.
Chinese Office Action for Application No. 201380074869.4 dated Nov. 1, 2016.

* cited by examiner

FIG.1
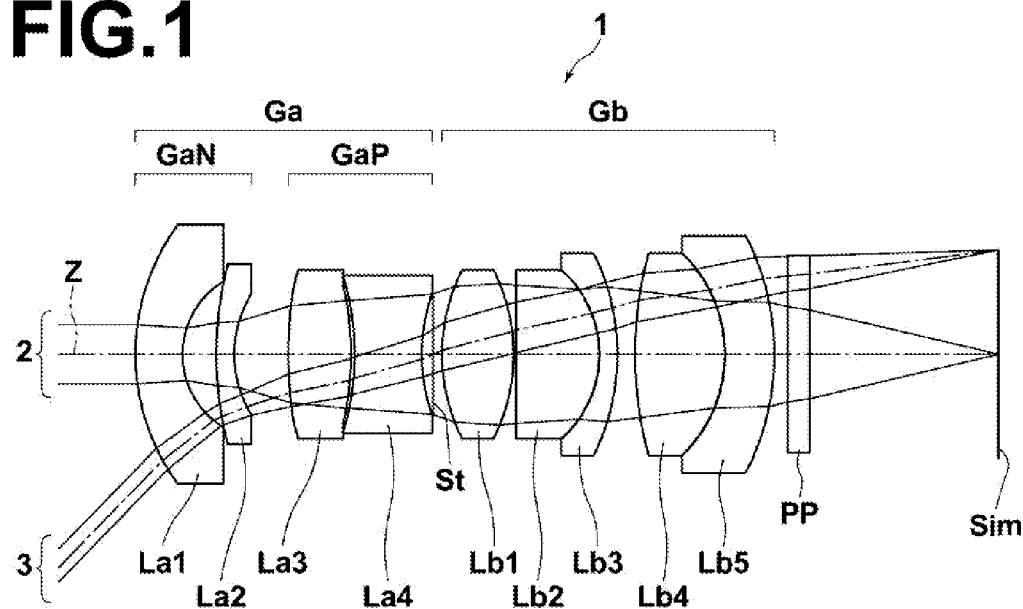
FIG.2     EXAMPLE 1
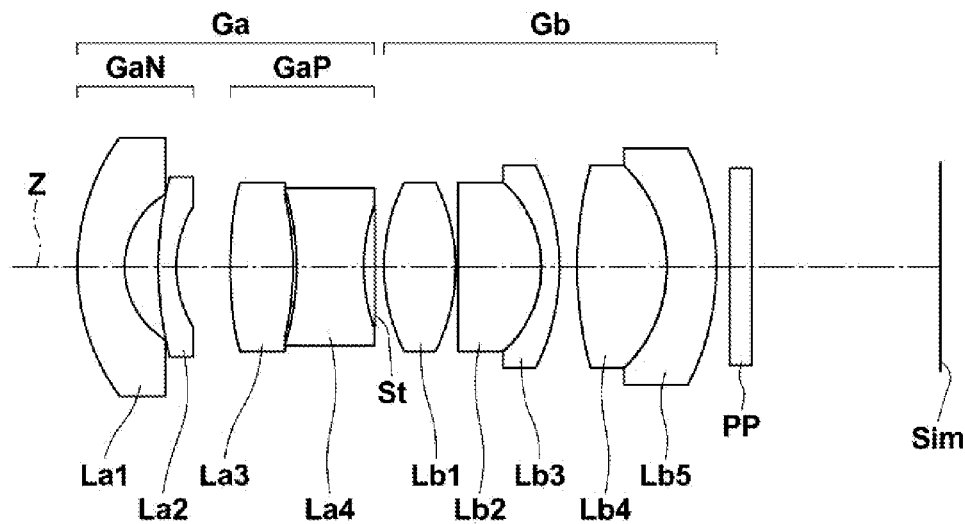

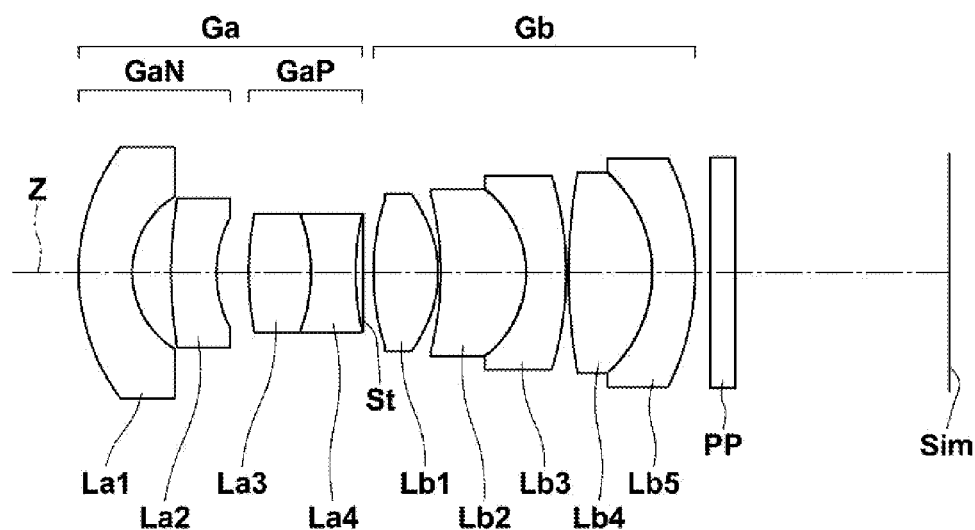
FIG.3 EXAMPLE 2
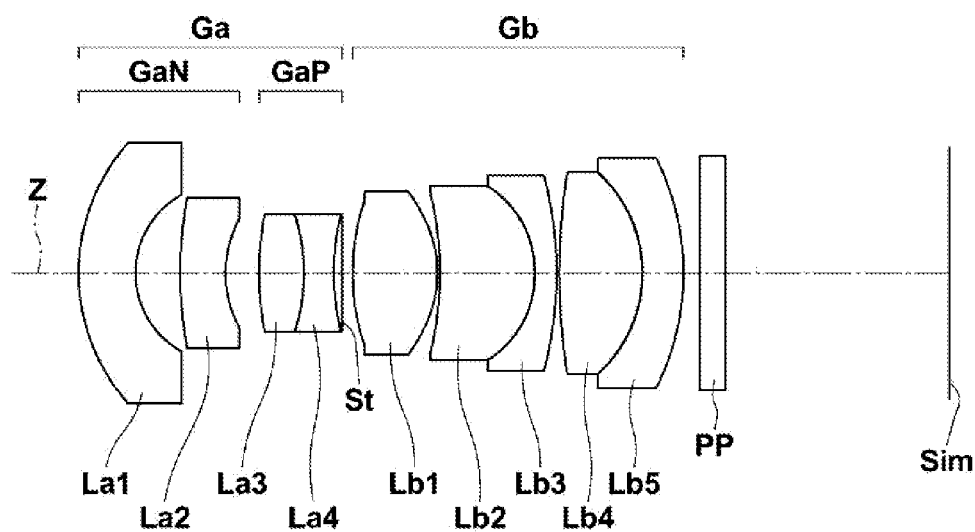
FIG.4 EXAMPLE 3

FIG.5 EXAMPLE 4
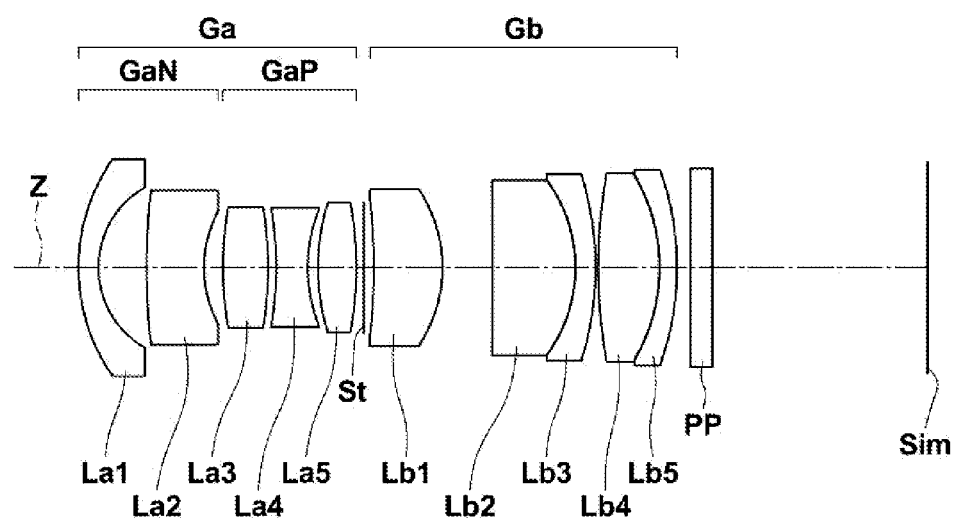
FIG.6 EXAMPLE 1
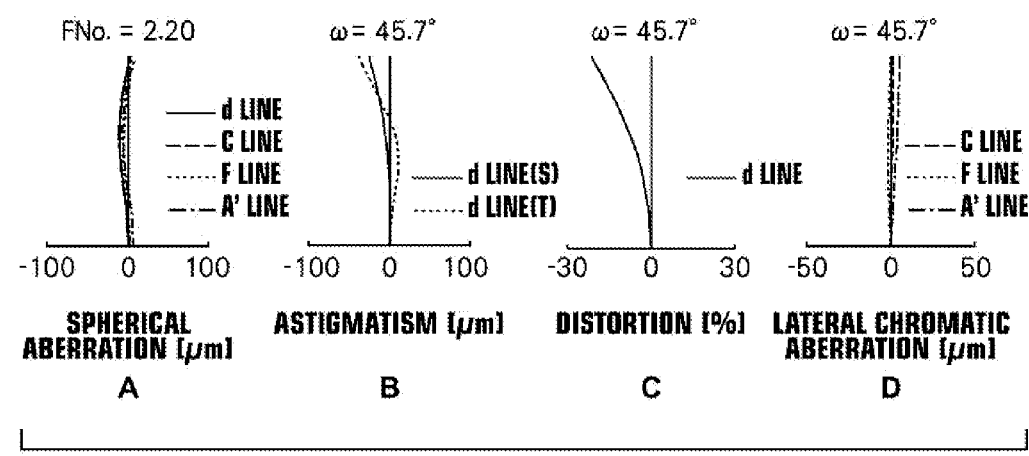

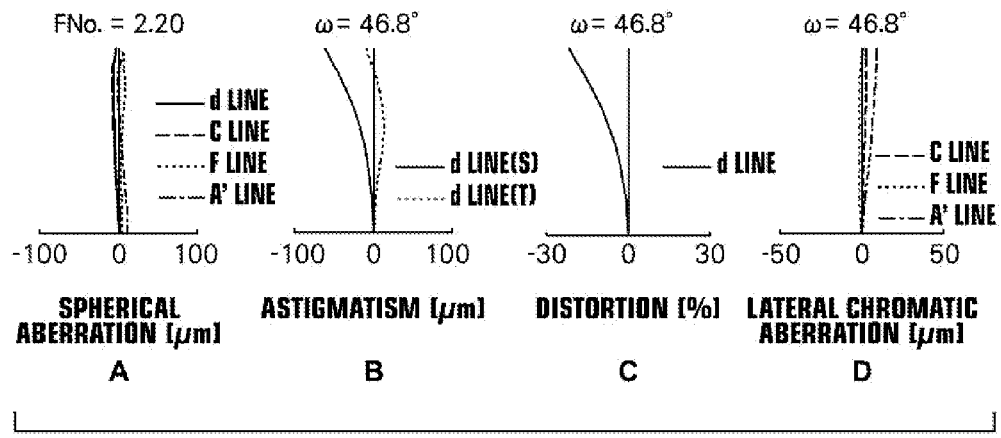
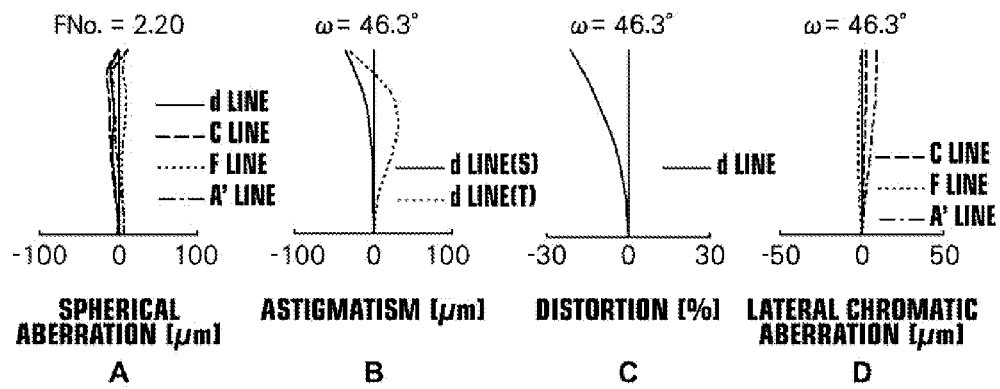

EXAMPLE 4

IMAGING LENS AND IMAGING APPARATUS EQUIPPED WITH THE IMAGING LENS

CROSS REFERENCE TO RELATED APPLICATIONS

The present application is a Continuation of PCT International Application No. PCT/JP2013/007606 filed on Dec. 26, 2013, which claims priority under 35 U.S.C. §119(a) to Japanese Patent Application No. 2013-065915 filed on Mar. 27, 2013. Each of the above applications is hereby expressly incorporated by reference, in its entirety, into the present application.

BACKGROUND

The present disclosure is related to an imaging lens and an imaging apparatus. More specifically, the present disclosure is related to an imaging lens which can be favorably utilized in a digital camera, a broadcast camera, a surveillance camera, a vehicle mounted camera, and the like, and to an imaging apparatus equipped with this imaging lens.

Conventionally, retro focus type lens systems, in which a front group having a negative refractive power and a rear group having a positive refractive power, provided in this order from the object side to the image side, are known. Examples of such retro focus type lenses are disclosed in Japanese Patent No. 3368138, Japanese Unexamined Patent Publication No. 2009-058817, and Japanese Unexamined Patent Publication No. 2000-039553, for example.

SUMMARY

There is demand for small F numbers and wide angles of view in imaging lenses which are employed in cameras in the above fields. Further, surveillance cameras and vehicle mounted cameras are often employed both day and night. Therefore, there is demand for various aberrations to be corrected from the visible range to the near infrared range. In addition, the number of pixels in imaging elements which are mounted on cameras is progressively increasing. There is demand for imaging lenses to have high performance which is compatible with an increased number of pixels.

However, it cannot be said that the lens system disclosed in Japanese Patent No. 3368138 has a sufficiently small F number, and a further widening of the angle of view of this lens system is also desirable. The lens system disclosed in Japanese Unexamined Patent Publication No. 2009-058817 has a wide angle of view, but it cannot be said that the F number thereof is small. In addition, there is room for improvement with respect to correction of aberrations in this lens system. None of the lens systems disclosed in Japanese Patent No. 3368138, Japanese Unexamined Patent Publication No. 2009-058817, and Japanese Unexamined Patent Publication No. 2000-039553 have favorably correcting various aberrations for light in the visible range to the near infrared range as an objective.

The present disclosure has been developed in view of the foregoing circumstances. The present disclosure provides an imaging lens that secures a small F number and a wide angle of view, favorably corrects various aberrations for light in the visible range to the near infrared range, and has high optical performance. The present disclosure also provides an imaging apparatus equipped with this imaging lens.

The imaging lens of the present disclosure consists essentially of, in order from the object side to the image side:

a front group having a negative refractive power;
a stop; and
a rear group having a positive refractive power;
the front group consisting of, in order from the object side to the image side, a front group negative lens group having a negative refractive power, constituted by at least two negative lenses, and a front group positive lens group having a positive refractive power, including one negative lens and one positive lens, in which a positive lens is provided most toward the object side;
the rear group including one negative lens and one positive lens; and
Conditional Formula (1) below being satisfied:

$$Nan + 0.01 \cdot van < 2.15 \tag{1}$$

wherein Nan is the refractive index of the negative lens provided most toward the image side within the front group positive lens group with respect to the d line, and van is the Abbe's number of the negative lens provided most toward the image side within the front group positive lens group with respect to the d line.

In the imaging lens of the present disclosure, it is preferable for Conditional Formula (1') below to be satisfied instead of Conditional Formula (1).

$$Nan + 0.01 \cdot van < 2.05 \tag{1'}$$

In addition, in the imaging lens of the present disclosure, it is preferable for Conditional Formula (2) below to be satisfied, and more preferable for Conditional Formula (2') below to be satisfied.

$$-1.0 < faN/f < -0.5 \tag{2}$$

$$-0.9 < faN/f < -0.6 \tag{2'}$$

wherein faN is the focal length of the front group negative lens group, and f is the focal length of the entire lens system.

In addition, in the imaging lens of the present disclosure, it is preferable for Conditional Formula (3) below to be satisfied, more preferable for Conditional Formula (3') below to be satisfied, and even more preferable for Conditional Formula (3") below to be satisfied.

$$0.05 < Dab/f < 1.55 \tag{3}$$

$$0.10 < Dab/f < 1.00 \tag{3'}$$

$$0.10 < Dab/f < 0.55 \tag{3''}$$

wherein Dab is the air distance along the optical axis between the front group and the rear group, and f is the focal length of the entire lens system.

In addition, in the imaging lens of the present disclosure, it is preferable for Conditional Formula (4) below to be satisfied, and more preferable for Conditional Formula (4') below to be satisfied.

$$vbp > 55 \tag{4}$$

$$vbp > 60 \tag{4'}$$

wherein vbp is the Abbe's number of the positive lens most toward the object side in the rear group with respect to the d line.

In addition, in the imaging lens of the present disclosure, it is preferable for the front group negative lens group to consist essentially of two negative meniscus lenses having convex surfaces toward the object side.

In addition, in the imaging lens of the present disclosure, it is preferable for the rear group to include two cemented lenses formed by cementing a positive lens and a negative lens together. In the case that the rear group includes two cemented lenses formed by cementing a positive lens and a negative lens together, it is preferable for the coupling surfaces of both of these two cemented lenses to be concave toward the object side.

In the imaging lens of the present disclosure, it is preferable for the rear group to consist essentially of, in order from the object side to the image side, a positive lens, a cemented lens formed by cementing a positive lens and a negative lens together, and a cemented lens formed by cementing a positive lens and a negative lens together.

Note that the term "essentially" in the expressions "consists essentially of" and "consist essentially of" above means that the imaging lens of the present disclosure may also include lenses that practically have no power, optical elements other than lenses such as a stop, a cover glass, and filters, and mechanical components such as lens flanges, a lens barrel, a camera shake correcting mechanism, etc., in addition to the constituent elements listed above.

Note that the signs of the refractive powers and the surface shapes of lenses in the imaging lens of the present disclosure will be considered in the paraxial region for lenses that include aspherical surfaces.

An imaging apparatus of the present disclosure is equipped with the imaging lens of the present disclosure.

According to the present disclosure, the configuration of each lens group is favorably set in a lens system consisting of, in order from the object side to the image side, a negative lens group, a positive lens group, a stop, and a positive rear group. In addition, the materials of the lenses are selected such that Conditional Formula (1) is satisfied. Therefore, it is possible to provide an imaging lens that secures a small F number and a wide angle of view, favorably corrects various aberrations for light in the visible range to the near infrared range, and has high optical performance, as well as an imaging apparatus equipped with this imaging lens.

BRIEF DESCRIPTION OF THE DRAWINGS

FIG. 1 is a cross sectional diagram that illustrates the configuration of an imaging lens according to an embodiment of the present disclosure and the paths of light beams that pass through the imaging lens.

FIG. 2 is a cross sectional diagram that illustrates the lens configuration of an imaging lens according to Example 1 of the present disclosure.

FIG. 3 is a cross sectional diagram that illustrates the lens configuration of an imaging lens according to Example 2 of the present disclosure.

FIG. 4 is a cross sectional diagram that illustrates the lens configuration of an imaging lens according to Example 3 of the present disclosure.

FIG. 5 is a cross sectional diagram that illustrates the lens configuration of an imaging lens according to Example 4 of the present disclosure.

FIG. 6 is a collection of diagrams (A through D) that illustrate aberrations of the imaging lens of Example 1 of the present disclosure.

FIG. 7 is a collection of diagrams (A through D) that illustrate aberrations of the imaging lens of Example 2 of the present disclosure.

FIG. 8 is a collection of diagrams (A through D) that illustrate aberrations of the imaging lens of Example 3 of the present disclosure.

DETAILED DESCRIPTION OF THE PREFERRED EMBODIMENTS

Figure 9:
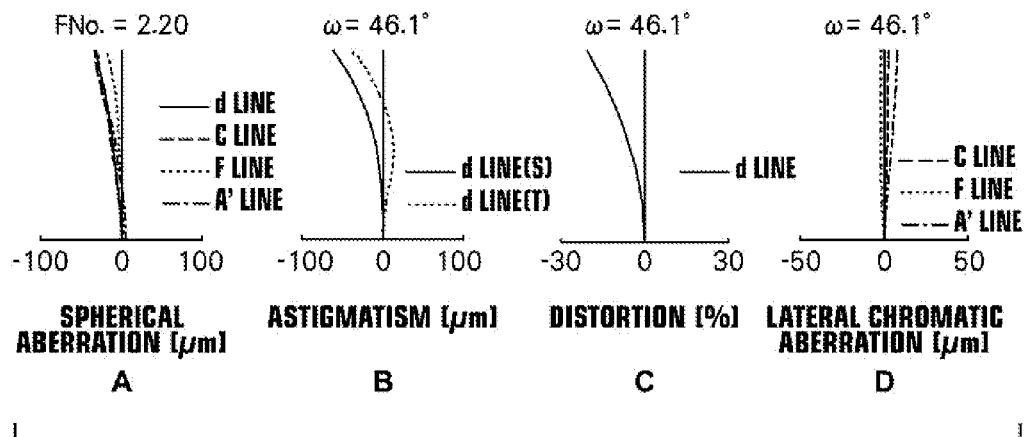
FIG. 9 is a collection of diagrams (A through D) that illustrate aberrations of the imaging lens of Example 4 of the present disclosure.

Hereinafter, embodiments of the present disclosure will be described in detail with reference to the attached drawings. FIG. 1 is a cross sectional diagram that illustrates the lens configuration of an imaging lens according to an embodiment of the present disclosure. The example of the configuration illustrated in FIG. 1 is common with the configuration of an imaging lens of Example 1 to be described later. In FIG. 1, the left side is the object side, and the right side is the image side. FIG. 1 also illustrates an axial light beam 2 and an off axis light beam 3 at a maximum angle of view.

This imaging lens consists essentially of, provided along an optical axis Z in order from the object side to the image side, a front group Ga having a negative refractive power, an aperture stop St, and a rear group Gb having a positive refractive power. Note that the aperture stop St illustrated in FIG. 1 does not necessarily represent the size or shape thereof, but merely indicates the position of the aperture stop St along the optical axis Z.

When this imaging lens is applied to an imaging apparatus, it is preferable for a cover glass for protecting an imaging element, a prism, and various filters, such as an infrared cutoff filter and a low pass filter, to be provided between the optical system and an imaging surface Sim, depending on the configuration of the camera to which the lens is mounted. Therefore, FIG. 1 illustrates an example in which a plane parallel plate shaped optical member PP that presumes such filters is provided between the rear group Gb and the imaging surface Sim. However, the optical member PP is not an indispensable constituent element of the imaging lens of the present disclosure.

The front group Ga consists of, in order from the object side to the image side, in order from the object side to the image side, a front group negative lens group GaN having a negative refractive power, constituted by at least two negative lenses, and a front group positive lens group GaP having a positive refractive power, including one negative lens and one positive lens, in which a positive lens is provided most toward the object side. The rear group Gb is configured to include one negative lens and one positive lens.

In the example illustrated in FIG. 1, for example, the front group negative lens group GaN is constituted by, in order from the object side to the image side, a negative lens La1 and a negative lens La2. The front group positive group GaP is constituted by, in order from the object side to the image side, a positive lens La3 and a negative lens La4. The rear group Gb is constituted by, in order from the object side to the image side, a positive lens Lb1, a cemented lens formed by cementing a positive lens Lb2 and a negative lens Lb3 together, and a cemented lens formed by cementing a positive lens Lb4 and a negative lens Lb5 together.

An imaging lens 1 has a negative lead power arrangement in which a lens group having a negative refractive power is provided most toward the object side, and lens groups having positive refractive powers are continuously provided thereafter. This configuration is advantageous from the viewpoint of widening the angle of view. In addition, the front group negative lens group GaN includes at least two negative lenses. Thereby, the negative power of the front group negative lens group GaN can be distributed among a plurality of lenses. As a result, a wide angle of view can be achieved while facilitating suppression of aberrations which are generated when widening the angle of view, particularly distortion.

In addition, front group Ga, which is more toward the object side than the aperture stop St, includes the front group positive lens group GaP. Therefore, the function of correcting spherical aberration to be borne by the rear group Gb more toward the image side than the aperture stop St can be distributed to the front group positive lens group GaP. This configuration is advantageous from the viewpoint of realizing an optical system having a small F number. The front group positive lens group GaP includes at least one negative lens and one positive lens. Therefore, correcting various aberrations including chromatic aberrations in a balanced manner is facilitated. The rear group Gb includes at least one negative lens and one positive lens. Therefore, correcting various aberrations including chromatic aberrations in a balanced manner is facilitated also by lenses more toward the image side than the aperture stop St as well.

The front group negative lens group GaN may be constituted by two negative lenses. In this case, the front group negative lens group GaN can be constituted by the minimum number of necessary lenses. As a result, the total length of the lens system can be suppressed, while also suppressing aberrations which are generated when widening the angle of view. In greater detail, the front group negative lens group GaN may be constituted by two negative meniscus lenses having convex surfaces toward the object side. Such a configuration is advantageous from the viewpoint of widening the angle of view.

The front group positive lens group GaP has a positive lens provided most toward the object side. Thereby, this positive lens can impart a converging effect on divergent light output from the front group negative lens group GaN and enters the front group positive lens group GaP, which is advantageous from the viewpoint of suppressing the amount of generated aberrations. The front group positive lens group GaP may be of a two lens configuration. In the case that a two lens configuration is adopted, the front group positive lens group GaP can be constituted by the minimum number of necessary lenses. As a result, the total length of the lens system can be suppressed. In the case that the front group positive lens group GaP adopts a two lens configuration, it is preferable for the front group positive lens group GaP to have, in order from the object side to the image side, a biconvex lens and a biconcave lens. By employing a biconvex lens as the positive lens, positive power can be distributed between the surface of the lens toward the object side and the surface of the lens toward the image side. By employing a biconcave lens as the negative lens, negative power can be distributed between the surface of the lens toward the object side and the surface of the lens toward the image side. Therefore, adopting a two lens configuration constituted by, in order from the object side to the image side, a biconvex lens and a biconcave lens, is advantageous from the viewpoint of suppressing spherical aberration.

Alternatively, the front group positive lens group GaP may be of a three lens configuration constituted by, in order from the object side to the image side, a positive lens, a negative lens, and a positive lens. In the case that such a so called triplet configuration is adopted, various aberrations can be favorably corrected, and configuring an optical system having a small F number is facilitated. In the case that the front group positive lens group GaP adopts a triplet configuration, it is preferable for the front group positive lens group GaP to be constituted by, in order from the object side to the image side, a biconvex lens, a biconcave lens, and a biconvex lens. This configuration is advantageous from the viewpoint of correcting spherical aberration and chromatic aberrations, particularly chromatic aberrations in the near infrared range.

It is preferable for the rear group Gb to include two cemented lenses formed by cementing a positive lens and a negative lens together. In this case, favorable correction of chromatic aberrations will be facilitated, and such a configuration is advantageous from the viewpoint of favorably correcting chromatic aberrations from the visible range to the near infrared range. In the case that the rear group Gb includes two cemented lenses in this manner, it is preferable for the coupling surfaces of both of the cemented lenses to be concave toward the object side. In this case, the incident angles of off axis light rays at the periphery of an image formation region that enter these coupling surfaces can be decreased. Therefore, the amount of generated aberrations can be suppressed, and this configuration is particularly advantageous from the viewpoint of correcting astigmatism.

In greater detail, it is preferable for the rear group Gb to include, in order from the object side to the image side a cemented lens formed by cementing a positive meniscus lens with a concave surface toward the object side and a negative meniscus lens with a concave surface toward the object side together, and a cemented lens formed by cementing a biconvex lens and a negative meniscus lens with a concave surface toward the object side together. Adopting such a configuration is more advantageous from the viewpoint of favorably correcting astigmatism and chromatic aberrations.

The rear group Gb may be constituted by, in order from the object side to the image side, a positive lens, a cemented lens formed by cementing a positive lens and a negative lens together, and a cemented lens formed by cementing a positive lens and a negative lens together, for example. In the case that such a configuration is adopted, it will become possible to cause the Petzval sum to approach zero. As a result, field curvature and astigmatism which are generated by the negative refractive power of the front group negative lens group GaN can be corrected.

In addition, the imaging lens 1 may be configured to include aspherical lenses. Such a configuration is advantageous from the viewpoints of widening the angle of view, achieving a small F number, and favorably correcting aberrations. It is more effective to configure at least one of the positive lens provided most toward the object side within the front group positive lens group GaP and the lens provided most toward the object side within the rear group Gb to be an aspherical lens.

The imaging lens 1 is configured such that Conditional Formula (1) below is satisfied.

$$Nan + 0.01 \cdot van < 2.15 \tag{1}$$

wherein Nan is the refractive index of the negative lens provided most toward the image side within the front group positive lens group GaP with respect to the d line, and van is the Abbe's number of the negative lens provided most toward the image side within the front group positive lens group GaP with respect to the d line.

Conditional Formula (1) is related to the material of the negative lens within the front group Ga close to the aperture stop St. Selecting the material of the negative lens provided most toward the image side within the front group positive lens group GaP such that the value of $Nan + 0.01 \cdot van$ is not greater than or equal to the upper limit defined in Conditional Formula (1) is advantageous from the viewpoint of chromatic aberrations. As a result, such a selection is advantageous from the viewpoint of favorably correcting various aberrations from the visible range to the near infrared range. In addition, by satisfying Conditional Formula (1), favorable correction of chromatic aberrations will become possible. Therefore, satisfying Conditional Formula (1) is advantageous from the viewpoint of realizing an optical system with a small F number.

It is more preferable for Conditional Formula (1') below to be satisfied, in order to cause the above advantageous effects to become more prominent.

$$Nan+0.01 \cdot van<2.05 \qquad (1')$$

In addition, in the imaging lens 1, it is preferable for Conditional Formula (2) below to be satisfied.

$$-1.0<faN/f<-0.5 \qquad (2)$$

wherein faN is the focal length of the front group negative lens group GaN, and f is the focal length of the entire lens system.

By securing the negative refractive power of the front group negative lens group GaN such that the value of faN/f is not less than or equal to the lower limit defined in Conditional Formula (2), realizing a wide angle of view will be facilitated. By suppressing the negative refractive power of the front group negative lens group GaN such that the value of faN/f is not greater than or equal to the upper limit defined in Conditional Formula (2), favorably correction of spherical aberration will be facilitated, which is advantageous from the viewpoint of realizing an optical system having a small F number.

It is more preferable for Conditional Formula (2') below to be satisfied, in order to cause the above advantageous effects to become more prominent.

$$-0.9<faN/f<-0.6 \qquad (2')$$

In addition, in the imaging lens 1, it is preferable for Conditional Formula (3) below to be satisfied.

$$0.05<Dab/f<1.55 \qquad (3)$$

wherein Dab is the air distance along the optical axis between the front group Ga and the rear group Gb, and f is the focal length of the entire lens system.

By securing the air distance along the optical axis between the front group Ga and the rear group Gb such that the value of Dab/f is not less than or equal to the lower limit defined in Conditional Formula (3), arrangement of the aperture stop St will be facilitated, which is advantageous from the viewpoint of correcting spherical aberration. By suppressing the air distance along the optical axis between the front group Ga and the rear group Gb such that the value of Dab/f is not greater than or equal to the upper limit defined in Conditional Formula (3), the total length of the lens system and the diameter of the lenses can be suppressed. As a result, it will be possible to configure the lens system to be compact, which is favorable for use of the lens system in surveillance cameras, vehicle mounted cameras, etc.

It is more preferable for Conditional Formula (3') below to be satisfied, and even more preferable for Conditional Formula (3'') below to be satisfied, in order to cause the above advantageous effects to become more prominent.

$$0.10<Dab/f<1.00 \qquad (3')$$

$$0.10<Dab/f<0.55 \qquad (3'')$$

In addition, in the imaging lens 1, it is preferable for Conditional Formula (4) below to be satisfied.

$$vbp>55 \qquad (4)$$

wherein vbp is the Abbe's number of the positive lens most toward the object side in the rear group Gb with respect to the d line.

Conditional Formula (4) is related to the material of the positive lens within the rear group Gb close to the aperture stop St. By selecting the material of the positive lens provided at the most object side within the rear group Gb such that the value of vbp is not less than or equal to the lower limit defined in Conditional Formula (4) will enable longitudinal chromatic aberration to be favorably corrected.

It is more preferable for Conditional Formula (4') below to be satisfied, in order to cause the above advantageous effects to become more prominent.

$$vbp>60 \qquad (4')$$

Arbitrary combinations of the preferable configurations described above are possible. It is preferable for the above configurations to be selectively adopted according to required specifications.

Next, examples of numerical values of the imaging lens of the present disclosure will be described.

EXAMPLE 1

FIG. 2 is a sectional diagram that illustrates the configuration of an imaging lens of Example 1. In FIG. 2, the left side is the object side, and the right side is the image side. FIG. 2 illustrates an example in which a parallel plate shaped optical member PP that presumes a cover glass, various filters, and the like is provided between the lens most toward the image side and an imaging surface Sim.

The group configuration of the imaging lens of Example 1 is, in order from the object side to the image side, a front group Ga having a negative refractive power, an aperture stop St, and a rear group Gb having a positive refractive power. The front group Ga is configured to be constituted by, in order from the object side to the image side, a front group negative lens group GaN having a negative refractive power and a front group positive lens group GaP having a positive refractive power.

The configuration of each lens that constitutes each of the lens groups of the imaging lens of Example 1 is as follows. The front group negative lens group GaN is constituted by, in order from the object side to the image side, a negative lens La1 and a negative lens La2. The front group positive lens group GaP is constituted by, in order from the object side to the image side, a positive lens La3 and a negative lens La4. The rear group Gb is constituted by, in order from the object side to the image side, a positive lens Lb1, cemented lens constituted by cementing a positive lens Lb2 and a negative lens Lb3 together, and a cemented lens constituted by cementing a positive lens Lb4 and a negative lens Lb5 together.

Basic lens data are shown in Table 1 and aspherical surface coefficients are shown in Table 2 as numerical value data that show the detailed configurations of the imaging lens of Example 1. Items related to the d line are shown in the uppermost row above the frame of Table 1. Among these items, f is the focal length of the entire lens system, Bf is the back focus as an air converted distance, FNo. is the F number, and 2ω is the full angle of view.

In Table 1, ith (i=1, 2, 3, ... ) lens surface numbers that sequentially increase from the object side to the image side, with the surface toward the object side of the constituent element at the most object side designated as first, are shown in the column Si. The radii of curvature of ith surfaces are shown in the column Ri, the distances between an ith surface and an i+1st surface along the optical axis Z are shown in the column Di. The lowermost row in the column Di shows the distance between the surface most toward the image side in Table 1 and the imaging surface Sim. Note that the signs of the radii of curvature are positive in cases that the surface shape is convex toward the object side, and negative in cases that the surface shape is convex toward the image side.

In Table 1, the refractive indices of jth (j=1, 2, 3, . . . ) optical elements that sequentially increase from the object side to the image side, with the optical element at the most object side designated as first, with respect to the d line (wavelength: 587.56 nm) are shown in the column Ndj. The Abbe's numbers of the jth optical element with respect to the d line are shown in the column vdj. Note that the aperture stop St and the optical member PP are also included in the basic lens data. Text reading "(St)" is indicated along with a surface number in the column of the surface numbers at the surface corresponding to the aperture stop St.

In the lens data of Table 1, the symbol "*" is appended to the surface numbers of aspherical surfaces, and numerical values that represent the paraxial radii of curvature are shown as the radii of curvature of the aspherical surfaces. Data of Table 2 related to aspherical surface coefficients show the surface numbers of the aspherical surfaces and aspherical surface coefficients related to the aspherical surfaces. "E-n" (n is an integer) means "·10$^{-n}$". The aspherical coefficients are the values of coefficients KA and Am (m=4, 6, 8, 10) in formula (A) below. In formula (A), Σ represents a sum related to the item m.

$$Zd = C \cdot h^2 / \{1 + (1 - KA \cdot C^2 \cdot h^2)^{1/2}\} \Sigma Am \cdot h^m \quad (A)$$

wherein: Zd is the depth of the aspherical surface (the length of a normal line from a point on the aspherical surface at a height h to a plane perpendicular to the optical axis in contact with the peak of the aspherical surface), h is height (the distance from the optical axis), C is the paraxial curvature, and KA and Am (m=4, 6, 8, 10) are aspherical surface coefficients.

In each of the tables below, degrees are used as the units for angles and mm are used as the units for lengths. However, it is possible for optical systems to be proportionately enlarged or proportionately reduced and utilized. Therefore, other appropriate units may be used. In addition, numerical values which are rounded off at a predetermined number of digits are shown in each of the tables below.

TABLE 1

| f = 5.74, Bf = 9.67, FNo. = 2.20, 2ω = 91.4° | | | | |
|---|---|---|---|---|
| Si | Ri | Di | Ndj | vdj |
| 1 | 9.7182 | 2.1000 | 1.85026 | 32.27 |
| 2 | 3.7838 | 1.5112 | | |
| 3 | 16.1324 | 0.8000 | 1.49700 | 81.54 |
| 4 | 5.1165 | 2.4119 | | |
| *5 | 19.8551 | 2.8000 | 1.90200 | 25.10 |
| *6 | −14.2030 | 0.1660 | | |
| 7 | −11.7970 | 3.0000 | 1.53172 | 48.84 |
| 8 | 8.0320 | 0.4998 | | |
| 9 (St) | ∞ | 0.4000 | | |
| 10 | 8.2024 | 3.2000 | 1.49700 | 81.54 |
| 11 | −8.2024 | 0.1000 | | |
| 12 | −1721.5094 | 3.7326 | 1.49700 | 81.54 |
| 13 | −4.9157 | 0.8000 | 1.85026 | 32.27 |
| 14 | −10.0109 | 0.7980 | | |
| 15 | 17.2640 | 4.0120 | 1.49700 | 81.54 |
| 16 | −6.2223 | 2.1999 | 1.83481 | 42.71 |
| 17 | −11.4804 | 0.6025 | | |
| 18 | ∞ | 0.9640 | 1.51633 | 64.14 |
| 19 | ∞ | 8.4274 | | |

TABLE 2

| | Surface Number | |
|---|---|---|
| | 5 | 6 |
| KA | −6.1350889E+01 | 8.9874619E+00 |
| A4 | 9.6949517E−04 | −5.2068302E−05 |
| A6 | −3.2954332E−05 | 3.1563654E−05 |
| A8 | 1.1950989E−06 | −3.1738709E−06 |
| A10 | 1.1327541E−07 | 2.7159277E−07 |

A through D of FIG. 6 are diagrams that respectively illustrate the spherical aberration, the astigmatism, the distortion, and the lateral chromatic aberration (aberration of magnification) of the imaging lens of Example 1 when the object distance is infinity. In the diagram that illustrates spherical aberration, "FNo." denotes F values. In the diagrams that illustrate the other aberrations, "ω" denotes half angles of view. Each of the diagrams that illustrate the aberrations, show aberrations with the d line (wavelength: 587.56 nm) as a reference. The diagram that illustrates spherical aberration also shows aberrations related to the C line (wavelength: 656.27 nm), aberrations related to the F line (wavelength: 486.13 nm), and aberrations related to the A' line (wavelength: 768.19 nm). The diagram that illustrates lateral chromatic aberration also shows aberrations related to the C line, the F line, and the A' line. In the diagram that illustrates astigmatism, aberrations in the sagittal direction are indicated by a solid line, while aberrations in the tangential direction are indicated by a broken line. The solid line and the broken line are respectively denoted by the symbols (S) and (T).

The symbols, the meanings, and the manners in which the various pieces of data are described in the description of Example 1 above are the same for the examples to be described below unless otherwise noted. Therefore, redundant portions will be omitted from the following descriptions of the other examples.

EXAMPLE 2

FIG. 3 is a cross sectional diagram that illustrates the lens configuration of the imaging lens of Example 2. The configuration of the groups and the schematic configuration of the imaging lens of Example 2 are the same as those of Example 1 described above except that a lens La3 and a lens La4 are cemented together. Table 3 and Table 4 respectively show basic lens data and aspherical surface coefficients of the imaging lens of Example 2. Various aberrations of the imaging lens of Example 2 are shown in A through D of FIG. 7.

TABLE 3

| f = 5.57, Bf = 9.61, FNo. = 2.20, 2ω = 93.6° | | | | |
|---|---|---|---|---|
| Si | Ri | Di | Ndj | vdj |
| 1 | 8.0976 | 2.1002 | 1.84661 | 23.78 |
| 2 | 3.4845 | 1.5206 | | |
| 3 | 17.3747 | 1.7787 | 1.71736 | 29.52 |
| 4 | 4.5631 | 1.2618 | | |
| 5 | 12.1618 | 2.4443 | 1.92287 | 18.90 |
| 6 | −6.2455 | 1.7408 | 1.71736 | 29.52 |
| 7 | 10.2513 | 0.3000 | | |
| 8 (St) | ∞ | 0.4000 | | |
| *9 | 9.8535 | 2.5307 | 1.51633 | 64.06 |
| *10 | −4.6098 | 0.1000 | | |
| 11 | −12.1720 | 3.3285 | 1.60300 | 65.44 |
| 12 | −4.0854 | 1.5824 | 1.78470 | 26.29 |

TABLE 3-continued f = 5.57, Bf = 9.61, FNo. = 2.20, 2ω = 93.6°

| Si | Ri | Di | Ndj | vdj |
|---|---|---|---|---|
| 13 | −12.9717 | 0.1000 | | |
| 14 | 21.5540 | 3.2754 | 1.60300 | 65.44 |
| 15 | −5.2287 | 1.6779 | 1.83481 | 42.73 |
| 16 | −9.8270 | 0.6025 | | |
| 17 | ∞ | 0.9640 | 1.51633 | 64.14 |
| 18 | ∞ | 8.3715 | | |

TABLE 4

| | Surface Number | |
|---|---|---|
| | 9 | 10 |
| KA | 2.3794506E+00 | 6.5135347E−01 |
| A4 | 2.6747136E−04 | 4.2601726E−04 |
| A6 | −1.6078283E−06 | 1.7783762E−05 |
| A8 | −8.5631968E−07 | −1.1699084E−06 |
| A10 | 7.2301680E−08 | 1.6188235E−07 |

EXAMPLE 3

FIG. 4 is a cross sectional diagram that illustrates the lens configuration of the imaging lens of Example 3. The configuration of the groups and the schematic configuration of the imaging lens of Example 3 are the same as those of Example 2. Table 5 and Table 6 respectively show basic lens data and aspherical surface coefficients of the imaging lens of Example 3. Various aberrations of the imaging lens of Example 3 are shown in A through D of FIG. 8.

TABLE 5 f = 5.62, Bf = 9.49, FNo. = 2.20, 2ω = 92.6°

| Si | Ri | Di | Ndj | vdj |
|---|---|---|---|---|
| 1 | 7.1738 | 2.1000 | 1.78472 | 25.68 |
| 2 | 3.2830 | 1.6573 | | |
| 3 | 15.2874 | 1.6746 | 1.80518 | 25.42 |
| 4 | 4.2077 | 1.2388 | | |
| 5 | 11.2187 | 1.6596 | 1.95906 | 17.47 |
| 6 | −6.9782 | 1.1015 | 1.76182 | 26.52 |
| 7 | 8.9877 | 0.2998 | | |
| 8 (St) | ∞ | 0.4000 | | |
| *9 | 8.7090 | 3.1220 | 1.51633 | 64.06 |
| *10 | −4.3242 | 0.1000 | | |
| 11 | −12.2355 | 3.5110 | 1.60300 | 65.44 |
| 12 | −3.7874 | 0.8000 | 1.72151 | 29.23 |
| 13 | −13.8172 | 0.1000 | | |
| 14 | 23.5901 | 3.0797 | 1.60300 | 65.44 |
| 15 | −4.9787 | 1.5047 | 1.83481 | 42.73 |
| 16 | −9.4006 | 0.6025 | | |
| 17 | ∞ | 0.9640 | 1.51633 | 64.14 |
| 18 | ∞ | 8.2489 | | |

TABLE 6

| | Surface Number | |
|---|---|---|
| | 9 | 10 |
| KA | 9.8957490E−01 | 5.9952431E−01 |
| A4 | 4.9138462E−04 | 3.8819966E−04 |
| A6 | −1.3504726E−05 | 2.6700965E−05 |
| A8 | −4.4627627E−07 | −3.9057996E−06 |
| A10 | 1.5023368E−07 | 4.0630642E−07 |

EXAMPLE 4

FIG. 5 is a cross sectional diagram that illustrates the lens configuration of the imaging lens of Example 4. The configuration of the groups and the schematic configuration of the imaging lens of Example 4 are the same as those of Example 1 described above except that a front group positive lens group GaP is constituted by, in order from the object side to the image side, a lens positive La3, a negative lens La4, and a positive lens La5. Table 7 and Table 8 respectively show basic lens data and aspherical surface coefficients of the imaging lens of Example 4. Various aberrations of the imaging lens of Example 4 are shown in A through D of FIG. 9.

TABLE 7 f = 5.09, Bf = 9.72, FNo. = 2.20, 2ω = 92.2°

| Si | Ri | Di | Ndj | vdj |
|---|---|---|---|---|
| 1 | 7.4972 | 0.8000 | 1.75500 | 52.32 |
| 2 | 3.6666 | 1.9227 | | |
| 3 | 26.2067 | 2.3002 | 1.83481 | 42.72 |
| 4 | 4.7268 | 0.7590 | | |
| *5 | 13.8538 | 1.8000 | 1.90200 | 25.10 |
| *6 | −15.6990 | 0.3320 | | |
| 7 | −13.6977 | 1.2632 | 1.58144 | 40.89 |
| 8 | 6.2716 | 0.4132 | | |
| 9 | 8.7704 | 1.5289 | 1.59282 | 68.63 |
| 10 | −13.9656 | 0.3000 | | |
| 11 (St) | ∞ | 0.4002 | | |
| 12 | −23.7612 | 2.7466 | 1.49700 | 81.61 |
| 13 | −5.5818 | 2.0000 | | |
| 14 | −194.8426 | 3.3238 | 1.59282 | 68.63 |
| 15 | −5.8538 | 0.8002 | 1.91082 | 35.25 |
| 16 | −12.2478 | 0.1000 | | |
| 17 | 20.3556 | 2.4697 | 1.49700 | 81.61 |
| 18 | −7.1828 | 0.6879 | 1.91082 | 35.25 |
| 19 | −11.5155 | 0.5440 | | |
| 20 | ∞ | 0.8704 | 1.51633 | 64.14 |
| 21 | ∞ | 8.6026 | | |

TABLE 8

| | Surface Number | |
|---|---|---|
| | 5 | 6 |
| KA | 5.7386598E−01 | 5.6603977E+00 |
| A4 | −6.2279439E−05 | −2.1506448E−04 |
| A6 | 9.3755264E−05 | 5.1839046E−05 |
| A8 | −1.8169543E−05 | −1.8751072E−05 |
| A10 | 1.6147164E−06 | 1.6078629E−06 |

Table 9 shows values corresponding to Conditional Formulae (1) through (4) for the imaging lenses of Examples 1 through 4. Note that the values shown in Table 9 are those that employ the d line as a reference wavelength.

TABLE 9

| Formula | | Example 1 | Example 2 | Example 3 | Example 4 |
|---|---|---|---|---|---|
| (1) | Nan + 0.01 · van | 2.02 | 2.01 | 2.03 | 1.99 |
| (2) | faN/f | −0.91 | −0.74 | −0.71 | −0.73 |
| (3) | Dab/f | 0.16 | 0.13 | 0.12 | 0.14 |
| (4) | vbp | 81.54 | 64.06 | 64.06 | 81.61 |

As can be understood from the above data, the imaging lenses of Examples 1 through 4 are constituted by nine or ten lenses, are configured with wide angles of view such that the full angles of view are within a range from approximately 90° to 100°, have small F numbers of 2.2 or less, favorably correct various aberrations from the visible range to the near infrared range, and have high optical performance.

Figure 10:
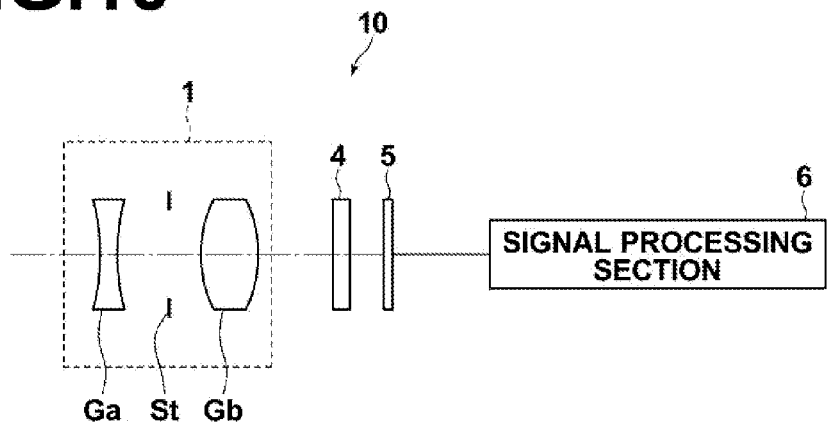
FIG. 10 is a diagram that schematically illustrates the configuration of an imaging apparatus according to an embodiment of the present disclosure.

The imaging lens of the present embodiment is favorably suited for use in imaging apparatuses such as digital cameras, broadcast cameras, surveillance cameras, and vehicle mounted cameras, as well as for interchangeable lenses for various types of cameras. Next, an imaging apparatus according to an embodiment of the present disclosure will be described with reference to FIG. 10. FIG. 10 schematically illustrates an imaging apparatus 10 that employs an imaging lens 1 of an embodiment of the present disclosure as an example of an imaging apparatus according to an embodiment of the present disclosure.

The imaging apparatus 10 illustrated in FIG. 10 is equipped with the imaging lens 1, a filter 4 provided at the image side of the imaging lens 1, an imaging element 5 for capturing images of subjects formed by the imaging lens, and a signal processing section. Note that FIG. 10 conceptually illustrates the imaging lens 1.

The imaging element 5 captures images of subjects formed by the imaging lens 1 and converts the images into electrical signals. The imaging element 5 is provided such that the image capturing surface thereof is positioned at the imaging surface of the imaging lens 1. A CCD (Charge Coupled Device), a CMOS (Complementary Metal Oxide Semiconductor), etc. may be employed as the imaging element 5, for example. Signals output from the imaging element 5 are processed by the signal processing section 6.

The present disclosure has been described with reference to the embodiments and Examples. However, the present disclosure is not limited to the above embodiments and Examples, and various modifications are possible. For example, the numerical values of the radii of curvature, the surface distances, the refractive indices, the Abbe's numbers, the aspherical surface coefficients, etc. of the lens components are not limited to those exemplified in the above Examples, and may be different values.

What is claimed is:

1. An imaging lens consisting of, in order from the object side to the image side:
    a front group having a negative refractive power;
    a stop; and
    a rear group having a positive refractive power;
    the front group consisting of, in order from the object side to the image side, a front group negative lens group having a negative refractive power, constituted by two negative lenses, and a front group positive lens group having a positive refractive power, including one positive lens and one negative lens, in which a positive lens is provided most toward the object side;
    the rear group consisting of, in order from the object side to the image side, a positive lens, a first cemented lens formed by cementing a positive lens and a negative lens together, and a second cemented lens formed by cementing a positive lens and a negative lens together; and
    Conditional Formula (1) below being satisfied:

$$Nan+(0.01 \times van) < 2.15 \quad (1)$$

wherein Nan is the refractive index of the negative lens provided most toward the image side within the front group positive lens group with respect to the d line, and van is the Abbe's number of the negative lens provided most toward the image side within the front group positive lens group with respect to the d line.

2. The imaging lens as defined in claim 1, in which Conditional Formula (2) below is satisfied:

$$-1.0 < faN/f < -0.5 \quad (2)$$

wherein faN is the focal length of the front group negative lens group, and f is the focal length of the entire lens system.

3. The imaging lens as defined in claim 2, in which Conditional Formula (2') below is satisfied:

$$-0.9 < faN/f < -0.6 \quad (2').$$

4. The imaging lens as defined in claim 1, in which Conditional Formula (3) below is satisfied:

$$0.05 < Dab/f < 1.55 \quad (3)$$

wherein Dab is the air distance along the optical axis between the front group and the rear group, and f is the focal length of the entire lens system.

5. The imaging lens as defined in claim 4, in which Conditional Formula (3') below is satisfied:

$$0.10 < Dab/f < 1.00 \quad (3').$$

6. The imaging lens as defined in claim 5, in which Conditional Formula (3") below is satisfied:

$$0.10 < Dab/f < 0.55 \quad (3'').$$

7. The imaging lens as defined in claim 1, in which Conditional Formula (4) below is satisfied:

$$vbp > 55 \quad (4)$$

wherein vbp is the Abbe's number of the positive lens most toward the object side in the rear group with respect to the d line.

8. The imaging lens as defined in claim 7, in which Conditional Formula (4') is satisfied:

$$Nbp > 60 \quad (4').$$

9. The imaging lens as defined in claim 1, wherein the front group negative lens group consists of two negative meniscus lenses having convex surfaces toward the object side.

10. The imaging lens as defined in claim 1, in which Conditional Formula (1') below is satisfied:

$$Nan+(0.01 \times van) < 2.05 \quad (1').$$

11. An imaging apparatus comprising the imaging lens as defined in claim 1.

* * * * *